Nov. 14, 1961 L. A. ROSENTHAL 3,008,791
SPIRAL TIME BASE RECORDER
Filed Oct. 13, 1958 2 Sheets-Sheet 1

INVENTOR
LOUIS A. ROSENTHAL
BY
ATTORNEY

Nov. 14, 1961 L. A. ROSENTHAL 3,008,791
SPIRAL TIME BASE RECORDER
Filed Oct. 13, 1958 2 Sheets-Sheet 2

INVENTOR.
LOUIS A. ROSENTHAL
BY Maurice W. Ryan

ATTORNEY

United States Patent Office 3,008,791
Patented Nov. 14, 1961

3,008,791
SPIRAL TIME BASE RECORDER
Louis A. Rosenthal, Highland Park, N.J., assignor to Union Carbide Corporation, a corporation of New York
Filed Oct. 13, 1958, Ser. No. 766,817
7 Claims. (Cl. 346—30)

This invention relates to a recorder. More particularly it relates to a novel circuit for generating a spiral time base.

According to the invention there is provided in combination with an x-y coordinate recorder a novel time base generating circuit which comprises a first means for providing a linearly changing output signal in response to a linearly changing mechanical signal supplied thereto. A second means has its input connected to the output of said first means and produces two quadrature sinusoidal voltages which are a function of the instantaneous magnitude of the output of the first named means. The angular displacement of said quadrature voltages is determined by a driving means for the second means which is adapted to drive same at a constant rotational speed recurrently through 360° of angular displacement. Means are provided for applying these quadrature voltages to the two inputs of a conventional x-y recorder to produce a spiral time base. Further means are provided for superimposing an incoming signal upon the signal from said first means.

In the study of long time phenomena, in which the data are presented as a recording or series of pulses corresponding to time, it is necessary to obtain the data in some compact form. For example, if a test run were to take 30 minutes, and the desired resolution was such as to require 10 inches of paper per minute, then a total of 300 inches (or 25 feet) of paper would be required. If a spiral trace were employed, wherein one circular sweep required one minute, then the entire recording could be put on a single circular (or rectangular) sheet. If the spirals were spaced ⅛" apart, only 3.75 inches of radial travel would be required. The outermost spiral would be 23.5" long and the length would continually decrease towards the origin to zero. Thus, the resolution would go from excellent to poor, but for many applications would be quite sufficient. In cases where pulses are timed, this technique is particularly attractive, since the position of the pulse is all that is desired.

The same problem arises also in the normal polar coordinate recorder. While giving a somewhat more compact record than the usual x-y recorder for a given time base, the actual linear time base distance is somewhat limited, i.e. a single traverse about the record. Hence, such a system is also quite limited in the length of time base it can cover with acceptable signal resolutions.

Such problems have arisen in the use of viscometers having indicating means whereby the output signal appears as a light beam scanning a series of photocells at a rate which depends on the flow of a viscous material. It is only necessary to time the photocell signal outputs. The amounts of paper that would be required, using a conventional recorder, would be prohibitive. In addition, equal resolution at all times is not required. It is extremely convenient to have the entire record on a single sheet of 8½ x 11 paper.

It is accordingly an object of the present invention to provide a recorder system having an extremely long time base and good resolution within a small area.

It is a further object to provide such a recording system wherein the advantages are achieved by developing a spiral time base.

It is a still further object to provide a system which will achieve a spiral time base when used with a conventional x-y recorder.

Other objects and advantages will be apparent from the accompanying description and drawings in which.

Figure 1:
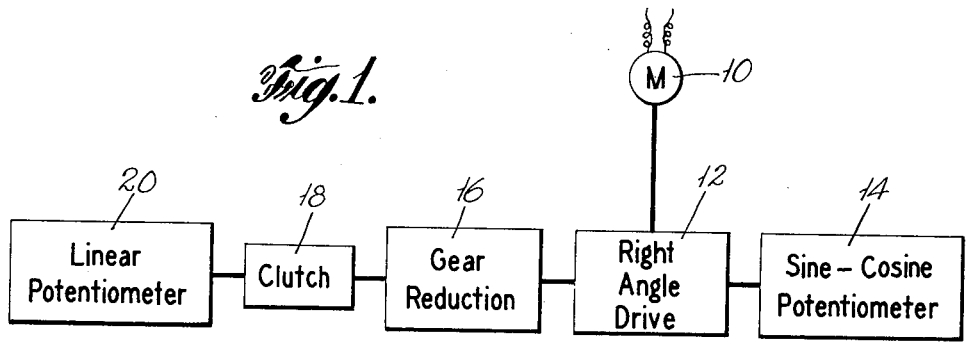
FIG. 1 is a block diagram showing the relation of the main elements of the system.

Referring to the circuit of FIGURE 1, the mechanical system comprises a motor 10, which is chosen to run at a speed corresponding to one sweep cycle in time, driving through a right angle drive 12. This drive is coupled by one shaft directly to a sine-cosine potentiometer 14 such as manufactured by Gamewell Co., Newton Falls, Mass., or F. W. Sickles Co., Chicopee, Mass. From the other shaft, a gear reduction unit 16, of about 50 to 1 reduction, drives a linear potentiometer 20 through a slip clutch 18. The gear reduction unit 16 thus determines the rate at which voltage to the sine-cosine potentiometer is increased by driving the movable contact on the linear potentiometer. The slip clutch 18 prevents injury to the linear potentiometer at its limits of travel, and also allows for an initial setting of the radial position of the x-y coordinate.

The sine-cosine potentiometer in its simplest form comprises a resistance card winding 22 to which is connected a direct current source, in this case the voltage from linear potentiometer 20. This causes current to flow through resistance card 22 setting up an electric field proportional to the current therethrough. Brushes 36 and 38, displaced by 90°, pick off two quadrature voltages. As resistance card 22 is rotated in a linear manner, the voltages picked off vary in a sinusoidal manner. For a more detailed discussion of the operation of sine-cosine potentiometer reference is made to the "Components Handbook" by Blackburn, vol. 17 of M.I.T. Radiation Series published by McGraw-Hill Co. Inc. or U.S. Patent No. 2,764,657 of L. A. Rosenthal.

Figure 2:
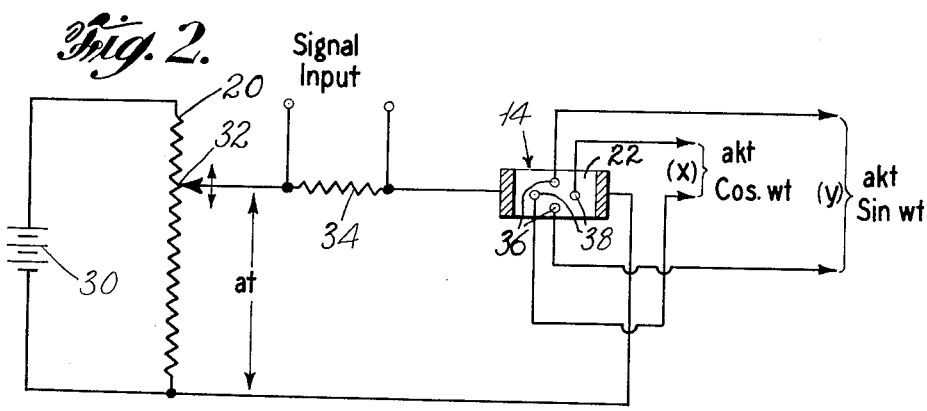
FIG. 2 is a schematic diagram of the electrical portion of the system.
Figure 4:
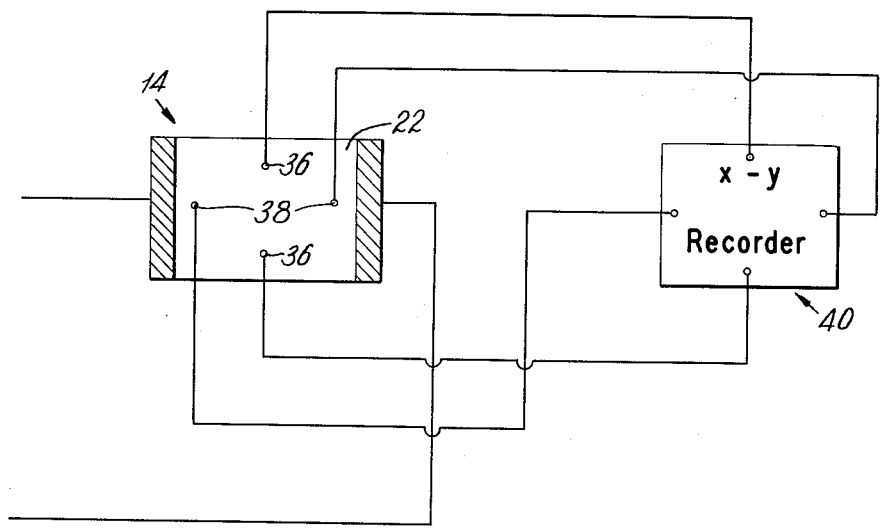
FIG. 4 is a schematic diagram showing the electrical connections between the portion of the system shown in FIG. 3 and an x-y recorder in accordance with the present invention.

FIGURES 2 and 4 show the electrical circuit employed. A battery 30 supplies voltage to the linear potentiometer 20. At the brush terminal 32, the voltage will increase (or decrease, depending on direction) in accordance with distance "at." This voltage is supplied directly to the sine-cosine potentiometer 14 through a resistor 34. Any signal that is to be plotted is placed across resistor 34. This is equivalent to adding a voltage in series to that applied to the sine-cosine potentiometer. Two outputs are available at terminals 36 and 38, which are applied to the two inputs of the x-y recorder 40. The operation principles will be explained below.

If the voltage applied to a sine-cosine potentiometer is of the form $$V = at$$

where $a$ is a constant and $t$ is time then the outputs available from this potentiometer are respectively $$V_1 = akt \cos wt$$
$$V_2 = akt \sin wt$$

and where $k$ is a number less than one (1) corresponding to the fraction of the applied voltage which is available as an output. The frequency term $w$ is the angular velocity of the sine-cosine potentiometer or $$w = 2\pi \times \text{r.p.m.} = \text{radians per minute}$$

If the voltages $V_1$ and $V_2$ are applied to an x-y recorder, then the respective deflections are proportional to the voltages, according to $$x = SV_1 = Sakt \cos wt$$
$$y = SV_2 = Sakt \sin wt$$

Here S is a deflection sensitivity for the recorder, which can be made equal for both channels.

Using the trigonometric identity $$\cos^2 wt = \sin^2 wt = 1$$

it is apparent that the resulting x-y trace will be $$\left(\frac{x}{Sakt}\right)^2 + \left(\frac{y}{Sakt}\right)^2 = 1$$

or $$x^2 + y^2 = \overline{Sakt}^2$$

This is the equation of a circle whose radius is increasing linearly with time. If the sensitives are unequal, then the equation becomes $$\left(\frac{x}{S_1}\right)^2 + \left(\frac{y}{S_2}\right)^2 = \overline{akt}^2$$

which is an ellipse, having its major and minor axes increasing linearly with time. The former case is of greater usefulness as a time base. The point having the coordinates x and y moves at an angular velocity which is w and has a linear velocity equal to closely $$w(x^2+y^2)^{1/2} = wSakt$$

Therefore, the linear velocity of the coordinate is directly proportional to time. It is apparent that the resolution of the time base is greatest when the instantaneous radius of the x-y trajectory is largest.

Figure 3:
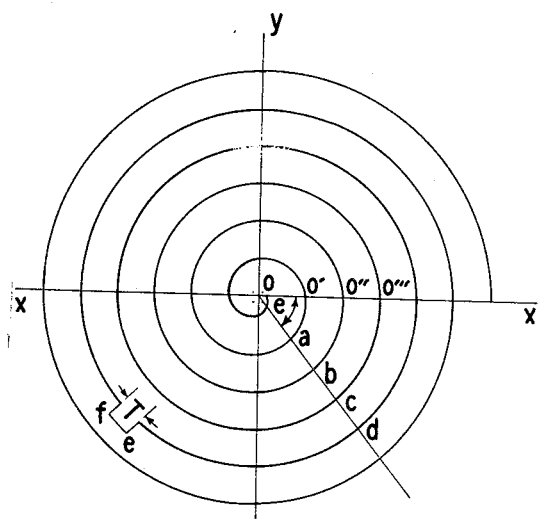
FIG. 3 is a graphical representation of an exemplary spiral trace achieved by use of the system.

For example, consider a case wherein the sine-cosine potentiometer is driven at 2 r.p.m. It will require 30 seconds to go between any two radial points as shown in FIGURE 3, i.e., (from a to b, or b to c, or c to d, etc.). The times from o' to a, or o'' to b, or o''' to c, etc., are all the same, corresponding to $\theta/2\pi \times 30$ seconds. Thus, it is a simple procedure to locate the time from o, the starting point, to any other point on the trace. By decreasing the voltage applied to the sine-cosine potentiometer, instead of increasing it, the spiral can be made to spiral in, instead of out.

If a signal is applied to the sine-cosine potentiometer in series with the linearly increasing voltage, then the instantaneous change in radius will be proportional to the signal. Thus, it is readily possible to superimpose a signal on the spiral trace which is now recorded in curvilinear coordinates. As shown in FIGURE 3, a pulse of duration T shows up between the points e and f. This pulse can be timed accurately in this coordinate system.

A conventional x-y recorder as referred to in both the specification and the claims is one in which two different and variable signal inputs are used to control the position of the indicating stylus along the x and y coordinates of a Cartesian graphic representation. An exemplary recorder readily available on the commercial market is the x-y plotter manufactured by F. Moseley and Company. A detailed description of a plotting board for a two-coordinate system (i.e. x-y) is described in Electronic Instruments, Greenwood et al., published by the McGraw-Hill Company, page 167. A self-balancing system for controlling the drive means for any one coordinate in accordance with an input signal is described exemplarily in U.S. Patent No. 2,584,954 of Williams entitled "Self Balancing Electrical System." However, the particular recorder used is not intended to be limiting as the system of the invention will work with any such recorder having two balanced inputs.

As may be seen from the foregoing description this invention will result in substantial savings in recorder paper, it will provide for compact data presentation. It will yield high resolution where desired. In addition, this device can be employed for the evaluation of x-y recorder stability, linearity, and accuracy, and may serve as a valuable tool for checking such recording equipment.

While the above specific embodiments have been described with particularity it is to be understood that many variations of individual components would be within the spirit and scope of the invention.

I claim:

1. In combination with an x-y coordinate recorder having an input for each coordinate, a time base generating circuit therefor which comprises a first means for providing a linearly changing electrical signal in response to a linearly changing mechanical signal supplied thereto, a second means having its input connected to the output of said first means and having a rotatable portion for producing two quadrature sinusoidal voltages which are a function of the instantaneous value of the output of said first means, first driving means for said first means and second driving means for driving the rotatable portion of said second means, the angular displacement of the quadrature voltages being determined by the angular displacement of the rotatable portion of the second means which is repeatedly rotated through 360° at a constant speed, means for applying the two quadrature voltages to the two inputs of the x-y recorder for producing a spiral time base, and means for imposing a signal on the input to the second means.

2. An apparatus as set forth in claim 1 wherein the first and second drive means are powered by a common motor.

3. An apparatus as set forth in claim 2 wherein the first means is driven through a gear reduction unit.

4. The apparatus set forth in claim 1 wherein the first means comprises a potentiometer whose movable contact is moved by the first driving means.

5. The apparatus set forth in claim 4 wherein the second means for producing the quadrature voltages is a sine-cosine potentiometer.

6. An apparatus for applying a spiral time base to a conventional x-y recorder having two signal inputs which comprises means for applying a linearly increasing electrical potential with signals superimposed thereon to the resistance winding of a sine-cosine potentiometer whose outputs are displaced 90° and whose magnitudes are a function of the applied voltage, means for rotating the said resistance winding at a constant speed, and means for applying the two quadrature voltages to the two inputs of the x-y recorder.

7. An apparatus for applying a spiral time base to an x-y recorder having two inputs which comprises a variable potentiometer having its end terminals connected to a constant direct current voltage source, the movable contact being actuated by a constant speed drive means and connected through a resistor to one side of the resistance winding of a sine-cosine potentiometer whose outputs are displaced 90° and whose magnitudes are a sine-cosine function of the exciting voltage, the other side of the resistance winding being connected to one of the end terminals of the potentiometer, terminals at either end of the resistor whereby a signal may be superimposed upon the original from the potentiometer, constant speed driving means for the sine-cosine potentiometer and means for connecting the two quadrature signals therefrom to the two inputs of an x-y recorder.

References Cited in the file of this patent

UNITED STATES PATENTS

| 1,322,148 | Sprague | Nov. 18, 1919 |
| 1,647,631 | Ives | Nov. 1, 1927 |
| 2,471,315 | Dehmel | May 24, 1949 |
| 2,511,197 | Darlington et al. | June 13, 1950 |

OTHER REFERENCES

"Cathode Ray Oscilloscopes and Their Uses," Rider and Uslan, copyright 1950, pp. 489–490, FIGS. 13–19 and 13–30.